(12) United States Patent
Barbastathis et al.

(10) Patent No.: US 9,684,106 B2
(45) Date of Patent: *Jun. 20, 2017

(54) SYSTEM, METHOD AND APPARATUS FOR PHASE CONTRAST ENHANCED MULTIPLEXING OF IMAGES

(75) Inventors: George Barbastathis, Boston, MA (US); Yuan Luo, Taipei (TW); Raymond K. Kostuk, Tucson, AZ (US); Jennifer K. Barton, Tucson, AZ (US)

(73) Assignees: Massachusetts Institute of Technology, Cambridge, MA (US); The Arizona Board of Regents on Behalf of the University of Arizona, Scottsdale, AZ (US)

( * ) Notice: Subject to any disclaimer, the term of this patent is extended or adjusted under 35 U.S.C. 154(b) by 913 days.

This patent is subject to a terminal disclaimer.

(21) Appl. No.: 13/500,467

(22) PCT Filed: Oct. 8, 2010

(86) PCT No.: PCT/US2010/051975
§ 371 (c)(1),
(2), (4) Date: Aug. 24, 2012

(87) PCT Pub. No.: WO2011/044460
PCT Pub. Date: Apr. 14, 2011

(65) Prior Publication Data
US 2012/0307326 A1 Dec. 6, 2012

Related U.S. Application Data

(60) Provisional application No. 61/250,306, filed on Oct. 9, 2009, provisional application No. 61/264,432, filed
(Continued)

(51) Int. Cl.
*G02B 5/32* (2006.01)
*G03H 1/02* (2006.01)
(Continued)

(52) U.S. Cl.
CPC ............. *G02B 5/32* (2013.01); *G03H 1/0248* (2013.01); *G03H 1/28* (2013.01); *G03H 1/041* (2013.01);
(Continued)

(58) Field of Classification Search
CPC ...... G02B 5/32; G02B 21/00; G02B 21/0056; G03H 1/0248; G03H 2001/0264;
(Continued)

(56) References Cited

U.S. PATENT DOCUMENTS 3,636,248 A 1/1972 Korpel
4,942,112 A 7/1990 Monroe et al.
(Continued)

OTHER PUBLICATIONS

Nagayama et al (Development of phase plates for electron microscopes and their biological applications, Eur BioPhys J , Jan. 8, 2008, vol. 37, pp. 345-358).*
(Continued)

*Primary Examiner* — Stephone B Allen
*Assistant Examiner* — Jyotsna Dabbi
(74) *Attorney, Agent, or Firm* — McCarter & English, LLP; David R. Burns

(57) ABSTRACT

A volume holographic imaging system, apparatus, and/or method enables the projection of a two-dimensional (2D) slice of a four-dimensional (4D) probing object. A 4D probing source object is illuminated to emit or scatter an optical field. A holographic element having one or more recorded holograms receives and diffracts the optical field into a diffracted plane beam having spectral information. A 4-f telecentric relay system includes a pupil filter on the
(Continued)

relayed conjugate plane of the volume hologram and images the pupil of the volume hologram onto the front focal plane of the collector lens. A collector lens focuses the diffracted plane beam to a 2D slice of the 4D probing source object. The focused 2D slice is projected onto a 2D imaging plane. The holographic element may have multiple multiplexed holograms that are arranged to diffract light from the corresponding slice of the 4D probing source object.

21 Claims, 10 Drawing Sheets

Related U.S. Application Data on Nov. 25, 2009, provisional application No. 61/381,369, filed on Sep. 9, 2010.

(51) Int. Cl.
 *G03H 1/28* (2006.01)
 *G03H 1/04* (2006.01)
(52) U.S. Cl.
 CPC ........... *G03H 2001/0264* (2013.01); *G03H 2001/0268* (2013.01); *G03H 2210/45* (2013.01); *G03H 2223/55* (2013.01)
(58) Field of Classification Search
 CPC ....... G03H 2210/45; G03H 2001/0268; G03H 1/28; G03H 1/041; G03H 2223/55; G03H 2001/0428; G03H 2001/005; G03H 1/0406; G03H 1/22–1/2205; G03H 2001/2207; G03H 1/26; G03H 1/2645–1/265; G03H 2001/2665; G03H 9/021

See application file for complete search history.

(56) References Cited

U.S. PATENT DOCUMENTS

| | | | |
|---|---|---|---|
| 5,966,243 A | 10/1999 | Braunecker et al. | |
| 6,495,818 B1 | 12/2002 | Mao | |
| 6,524,756 B1 | 2/2003 | Wu | |
| 6,744,048 B2* | 6/2004 | Hosokawa et al. | 250/311 |
| 6,934,060 B2 | 8/2005 | Psaltis | |
| 7,158,228 B2 | 1/2007 | Psaltis et al. | |
| 7,312,908 B2 | 12/2007 | Takemori et al. | |
| 9,256,202 B2* | 2/2016 | Barbastathis | G03H 1/0005 |
| 2005/0146701 A1* | 7/2005 | Holderer | G02B 17/08 355/67 |
| 2007/0013999 A1 | 1/2007 | Marks et al. | |
| 2007/0216906 A1 | 9/2007 | Javidi et al. | |
| 2009/0009668 A1 | 1/2009 | Tan et al. | |
| 2009/0073563 A1 | 3/2009 | Betzig | |
| 2009/0195866 A1* | 8/2009 | Kawaski | G01N 21/6458 359/385 |
| 2010/0039918 A1 | 2/2010 | Tanaka | |

OTHER PUBLICATIONS

Luo et al (Optimization of multiplexed holographic gratings in PQ-PMMA for spectral-spatial imaging filters, Optics Letters, vol. 33, No. 6, Mar. 15, 2008, pp. 566-568).*
International Preliminary Report on Patentability by International Bureau of WIPO for International Application PCT/US2010/051975 dated Apr. 11, 2012 (7 pages).
International Preliminary Report on Patentability by the International Bureau of WIPO for International Application PCT/US2010/051979 dated Apr. 11, 2012 (7 pages).
International Preliminary Report on Patentability by the International Bureau of WIPO for International Application PCT/US2010/051981 dated Apr. 11, 2012 (5 pages).
International Search Report and Written Opinion by International Searching Authority for International Application PCT/2010/51981 dated Dec. 13, 2010 (15 pages).
International Search Report and Written Opinion by International Searching Authority for International Application PCT/US2010/51975 mailed Dec. 13, 2010 (7 pages).
International Search Report and Written Opinion by International Searching Authority for International Application PCT/US2010/51979 dated Dec. 16, 2010 (13 pages).
Liu, Wenhai, George Barbastathis, and Demetri Psaltis. "Volume holographic hyperspectral imaging." Applied Optics, 43, No. 18, (Jun. 20, 2004): 3581-3599.
Luo, Y. "Novel Biomedical Imaging Systems", thesis submitted at University of Arizona. Jul. 18, 2008 (188 pages).
Luo, Yuan, et al. "Optimization of multiplexed holographic gratings in PQ-PMMA for spectral-spatial imaging filters." Optics letters 33, No. 6 (Mar. 15, 2008): 566-568.
Nagayama, Kuniaki. "Development of phase plates for electron microscopes and their biological application." European Biophysics Journal 37, No. 4 (Feb. 8, 2008): 345-358.

* cited by examiner

SYSTEM, METHOD AND APPARATUS FOR PHASE CONTRAST ENHANCED MULTIPLEXING OF IMAGES

STATEMENT OF GOVERNMENT INTEREST

This invention was made with government support under Grant No. CA118167 awarded by the National Institutes of Health. The government has certain rights in the invention.

RELATED APPLICATIONS

This application is related to U.S. Provisional Application Ser. No. 61/250,306, entitled "Phase Contrast Multi-Focal Microscope" filed Oct. 9, 2009, U.S. Provisional Application Ser. No. 61/264,432, entitled "Wavelength-Coded Multi-Focal Microscope" filed Nov. 25, 2009, U.S. Provisional Application Ser. No. 61/381,369, entitled "System, Method and Apparatus for Contrast Enhanced Multiplexing of Images" filed Sep. 9, 2010, International Patent Application Serial No. PCT/US2010/051979, entitled "System, Method and Apparatus for Contrast Enhanced Multiplexing of Images" filed Oct. 8, 2010, and International Patent Application Serial No. PCT/US2010/051981, entitled "System, Method and Apparatus for Wavelength-Coded Multi-Focal Microscopy" filed Oct. 8, 2010, each application in its entirety is incorporated by reference.

BACKGROUND

This disclosure relates generally to imaging systems, methods and apparatus, and more particularly to volume holographic imaging systems, methods and apparatus that obtain enhanced images from multiple depths within an object.

Microscopic imaging systems are beneficial for biomedical and clinical applications. Volume holographic microscopy (VHM) has been developed as a microscopic instrument for biological samples. Volume imaging systems have many useful applications such as spectral and three spatial dimensional biological imaging (known as four-dimensional (4D) imaging), endoscope imaging systems, spectrometers, and the like.

VHM incorporates multiplexed holographic gratings within a volume hologram to visualize structures at different focal planes in an object. Each focal plane within the object is projected to a different lateral location on the camera. Thus, the entire object volume is imaged slice-wise onto the camera without the need for electrical or mechanical scanning. However, many objects of interest are composed of weak phase features with poor contrast and are barely observable with VHM.

SUMMARY

Embodiments taught herein relate generally to imaging systems, methods and apparatus, and more particularly to volume holographic imaging systems, methods and apparatus that obtain enhanced images from multiple depths within an object.

An exemplary contrast enhanced multiplexing image system taught herein obtains contrast enhanced information from multiple depths within an object without scanning. A phase filter is introduced into the Fourier plane of a 4-f telecentric relay system to enhance weak phase information from a volume holographic imaging system. The exemplary system can be expanded to include additional multiplexed holographic gratings within a single volume hologram and, hence, simultaneously image more object slices onto non-overlapping locations on an imaging plane without scanning.

An exemplary microscope as taught herein includes focusing lenses, a holographic element, relay lenses, a phase filter and an imaging plane. The lenses, holographic element and phase filter together project an image onto the imaging plane. The phase filter is advantageously located at the conjugate plane of the holographic element's pupil. The holographic element is a volume hologram with one or more multiplexed hologram gratings therein. The multiplexed holographic gratings are located at the Fourier plane of the microscope and are Bragg matched to a different focal plane within an object and simultaneously projected to a different lateral location on the imaging plane. In the exemplary embodiments, the holographic element is recorded in phenanthrenquinone doped poly methyl methacrylate.

An exemplary volume imaging system for imaging a source object as taught herein includes a holographic element, collector optics and a phase filter. The holographic element is capable of recording one or more holograms of the source object and is configured to receive and diffract an optical field emitted or scattered from the source object onto one or more diffracted plane beams. The collector optics are configured to focus each of the one or more diffracted plane beams to a two-dimensional slice of the source object, and simultaneously project the focused two-dimensional slice along an optical path onto an imaging plane. The phase filter is disposed along the optical path to eliminate the DC component in the spatial frequency domain of the focused two-dimensional slice of the source object.

An exemplary method for imaging an object in four-dimensions and real time in which an emitted or scattered optical field of an object is received by a holographic element which diffracts the received optical field into one or more diffracted plane beams. The diffracted plane beams are focused into a two-dimensional slice of the object and filtered. The filtered two-dimensional slice is projected onto an imaging plane. When two or more slices of the object are projected, the slices are simultaneously projected onto non-overlapping regions on the imaging plane. The filtering step is performed using a phase filter. The diffraction is based on one or more Bragg degeneracy properties.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DESCRIPTION OF EXEMPLARY EMBODIMENTS

In accordance with various embodiments taught herein are single sideband edge enhancement volume holographic imaging systems that employ a phase filter to obtain phase contrast enhanced images from multiple depths within an object. An exemplary volume holographic imaging system can obtain contrast enhanced information from multiple depths within biological samples without scanning. An exemplary volume holographic imaging system enhances weak phase information of the displayed images which are from different depths within biological samples by introducing a phase filter at the plane conjugate to the volume holographic pupil during imaging. This enhances weak phase features from multiple depths. An exemplary volume holographic imaging system images the entire object volume in real time without electrical or mechanical scanning, and provides enhanced edge and phase information at all slices simultaneously. The volume holographic imaging system may be a microscope, spectroscope, endoscope, and the like and may be known as single sideband edge enhancement volume holographic microscope.

A mouse colon placed in the exemplary imaging system as taught herein results in two-depth resolved images separated by approximately 50 µm simultaneously displayed on an imaging plane. With the exemplary volume hologram imaging method for weak phase enhancement, the exemplary system improves phase contrast of the object by up to 89.0 times over conventional VHM methods.

Figure 1:
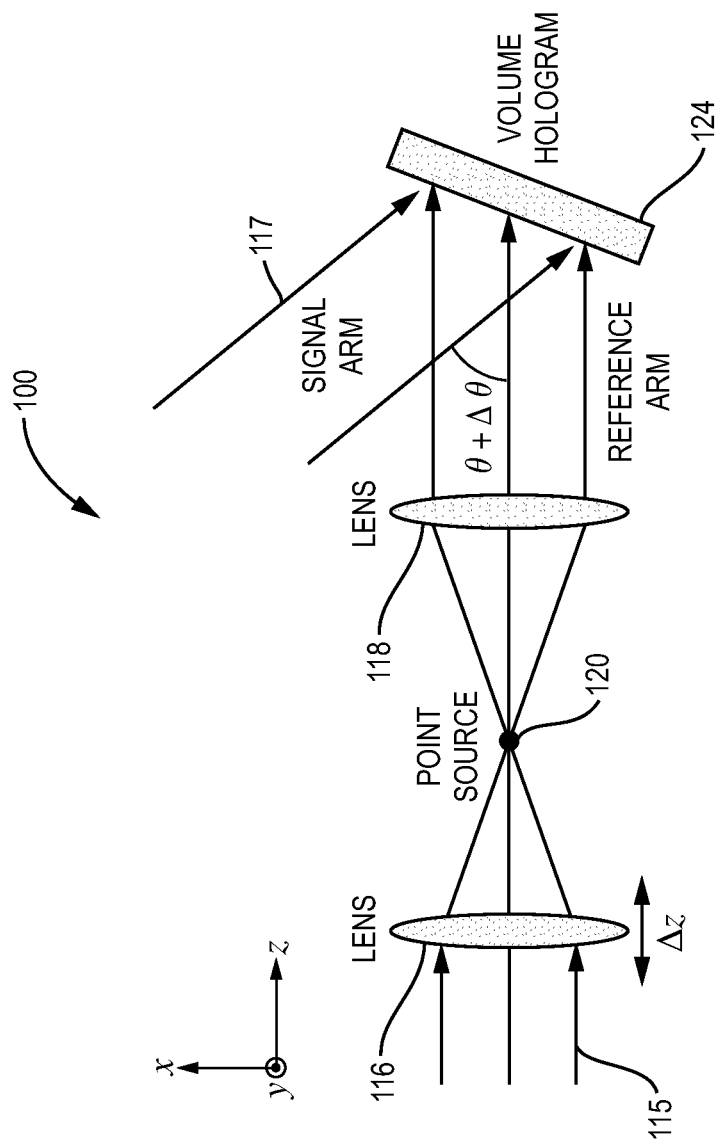
FIG. 1 depicts an illustrative diagrammatic view of a recording arrangement for multiplexing holographic gratings within a volume hologram as taught herein.

FIG. 1 illustrates an exemplary recording arrangement 100 for multiplexing holographic gratings, or recording multiple holographic gratings, within a volume hologram 124 using a source of electromagnetic radiation such as a collimated laser beam. A holographic grating may be created in a transmissive volume hologram by recording the interference pattern of two mutually coherent light beams. In an exemplary embodiment, a collimated laser beam, not shown, is split into a reference arm 115 and a signal arm 117. A point source 120 along the reference arm 115 is formed by lens 116. The point source 120 provides the source of electromagnetic radiation along the reference arm 115 which interferes with the signal arm 117 to record a grating in the multiplexed volume hologram 124. More than one grating is formed in multiplexed volume hologram 124 by varying the position of the point source 120 in the reference arm, for example, by moving lens 116 while lens 118 stays fixed, between different exposures of electromagnetic radiation from the collimated laser beam. The nominal inter-beam angle θ is the angle between signal arm 117 and reference arm 115 at the volume hologram 124 surface and is changed by Δθ between exposures.

In some embodiments, the nominal inter-beam angle in air is 68°, Δθ is 1°, and Δz is 50 µm. In the same embodiment, the recording medium of volume hologram 124 is phenanthrenquinone doped poly methyl methacrylate (PQ-doped PMMA) and the collimated laser beam is an argon-ion ($Ar^+$) laser operating at a wavelength of approximately 488 nm.

Other materials may be used as a recording medium. By way of example, Aprilis ULSH-500, $LiNbO_3$ including Zn-doped $LiNbO_3$ and DuPont photopolymers may be used as recording material. (See Atsushi Sato et al, Applied Optics vol. 42, pp. 778-784, (2003), Yasuo Tomita et al, Optics Express vol. 14, pp. 5773-5778 (2006), and Raymond K. Kostuk et al, Applied Optics vol. 38, pp. 1357-1363 (1999)). Those skilled in the art will appreciate that each material has a range of sensitivity for recording and that another source of electromagnetic radiation with appropriate wavelength in the corresponding range of sensitivity may be used for recording. With proper fabrication, the multiplexed holographic gratings within a volume hologram can operate at wavelengths longer than the recording wavelength of signal arm 117 and reference arm 115. (See Y. Luo, P. J. Gelsinger, J. K. Barton, G. Barbastathis, and R. K. Kostuk, Opt. Lett. Vol. 33, 566-568 (2008) which is incorporated by reference herein in its entirety). In the same embodiment, the diffraction efficiencies of the two multiplexed gratings are approximately 40% and approximately 35%, the thickness of the PQ-doped PMMA recording material is approximately 1.5 mm, and the numerical apertures of lens 116 and lens 118 are 0.65 and 0.55, respectively.

Figure 2:
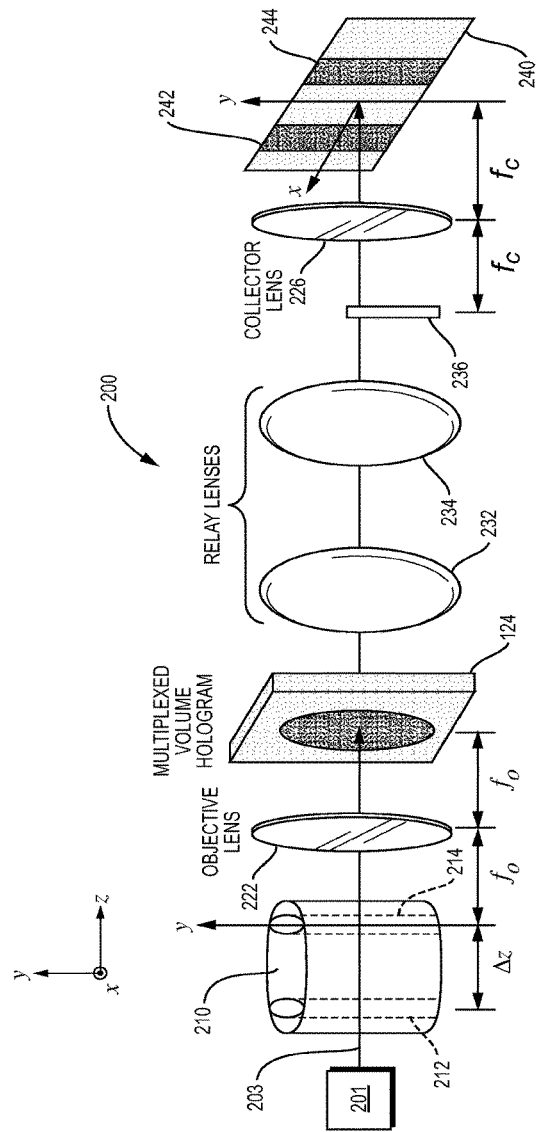
FIG. 2 depicts an illustrative diagrammatic view of a volume holographic microscope as taught herein.

FIG. 2 illustrates an exemplary imaging system 200 which may be a SSEE-VHM system as taught herein. The system 200 includes an optional source of electromagnetic radiation 201, an objective lens 222, the multiplexed volume hologram 124, relay lenses 232 and 234, a phase filter 236, a collector lens 226, and an imaging plane 240. Source 201 emits an electromagnetic field along signal arm 203 to object 210. An objective lens 222 acts to collimate the optical field emitted or scattered from the object 210. The collimated field passes through the multiplexed volume hologram 124 towards relay lenses 232 and 234. The emitted holographic representation from the multiplexed volume hologram 124 is relayed by lenses 232 and 234 towards the knife filter 236. The filtered representation from the knife filter 236 is collected by the collector lens 226 which projects images to the imaging plane 240. In an exemplary embodiment, the multiplexed volume hologram 124 has two multiplexed gratings. Each grating is Bragg matched to a different two-dimensional (2D) slices of the object 210 taken along the y-axis at first focal plane 212 and second focal plane 214. Thus, in the same embodiment, images of focal planes 212 and 214 are simultaneously projected by the system 200 to non-overlapping lateral locations, 242 and 244, respectively, on the image plane 240. The gratings are diffractive elements consisting of a periodic phase or absorption perturbation throughout the entire volume of the holographic element. When a beam of incident light satisfies the Bragg phase matching condition it is diffracted by the periodic perturbation. Those skilled in the art would appreciate that Bragg matched refers to satisfying the Bragg matching condition which occurs when the diffraction efficiency of a transmissive volume hologram is maximized.

In an exemplary embodiment, the multiplexed volume hologram 124 is located at the Fourier plane of the objective lens 222. Similarly, the imaging plane 240 is located at the Fourier plane of the collector lens 226. In the same embodiment, the distance $f_o$ is the distance between the second focal plane 214 and the objective lens 222. Those skilled in the art would appreciate that the grating within multiplexed volume hologram 124 that is Bragged matched to the second focal plane 214 is located a distance of $f_o$ from the objective lens 222. Relatively positioned between the multiplexed volume hologram 124 and the collector lens 226 is a relay system composed of relay lenses 232 and 234. Phase filter 236 is located such that it images the pupil of the multiplexed volume hologram onto the front focal plane of the collector lens 226. The distance $f_c$ is the distance between the phase filter 236 and the collector lens 226, which is the same distance between the collector lens 226 and the imaging plane 240.

In exemplary embodiments, the source of electromagnetic radiation may be a plurality of coherent light sources, a broadband light source such as a dispersed white-light source with chromatic foci, a plurality of light emitting diodes or the like. The imaging plane 240 may be part of a charge couple device or camera which may be connected to or part of a computer, projector, or other such device. In some embodiments, the phase filter may be a knife edge filter, Zernike filter, or the like.

Figure 3:
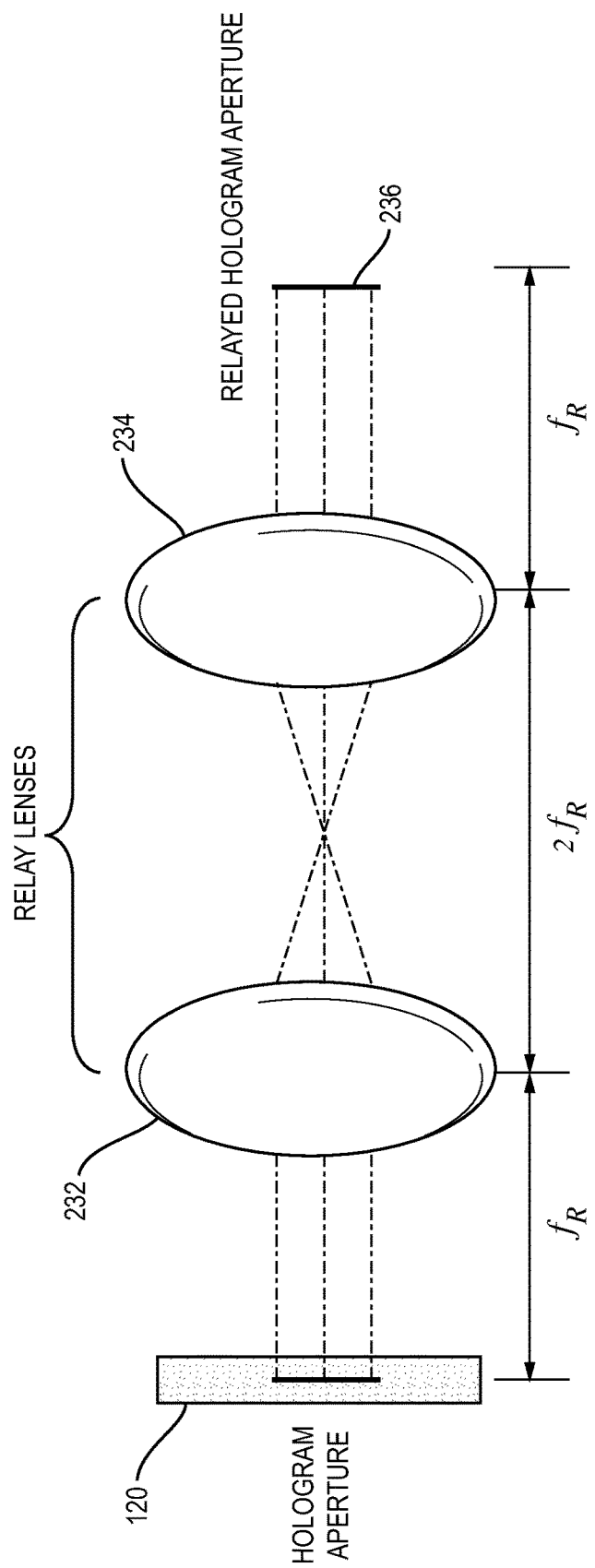
FIG. 3 depicts an illustrative diagrammatic view of the 4-f telecentric relay system of the volume holographic microscope of FIG. 2.

FIG. 3 depicts an exemplary placement relationship of the relay system located between lenses 232 and 234 of the imaging system of FIG. 2. The relay system located between lenses 232 and 234 is a 4-f telecentric system. The distance $f_R$ is the distance between the multiplexed volume hologram 124 and the relay lens 232. The distance between the relay lenses 232 and 234 is two times the length of distance $f_R$. The distance $f_R$ is also the distance between the relay lens 234 and the phase filter 236. Phase filter 236 is therefore located on the conjugate plane of the multiplexed volume hologram 124 relayed through the 4-f telecentric relay system, i.e. on the 4-f telecentric relay system's Fourier plane. The phase filter 236 eliminates all components to the one side of the DC component in the spatial frequency domain to achieve the single sideband edge enhancement method, as taught herein. The one-dimensional transmittance of the phase filter 236 at the Fourier space is given in Equation 1 as:

$$t_{filter}(f_y) = 1 + \text{sgn}(f_y) \quad (1)$$

where sgn is the signum function and $\text{sgn}(f_y)=1$ at $f_y>0$; $\text{sgn}(f_y)=0$ at $f_y=0$; $\text{sgn}(f_y)=-1$ at $f_y<0$. For a weak phase object, $\exp[j\phi(y)] \approx 1+j\phi(y)$ where $\phi(y)$ is the phase in the y-direction. When a weak phase object is placed in the exemplary imaging system, the resultant image, centered at the appropriate transverse location on the image plane, can be written in Equation 2 as:

$$I_i = |[1 + j\phi(y)] * FT[1 + \text{sgn}(f_y)]|^2 \propto \phi(y) * \frac{1}{\pi y} \quad (2)$$

where $I_i$ is the irradiance distribution of the image and FT is the Fourier transform. The Hilbert transform reduces the DC component and significantly enhances the detection sensitivity of phase jumps or edges. This enhancement is observed in parallel at all the multiplexed focal planes (slice-wise images from multiple depths within object 210) of the imaging system 200.

Figure 4:
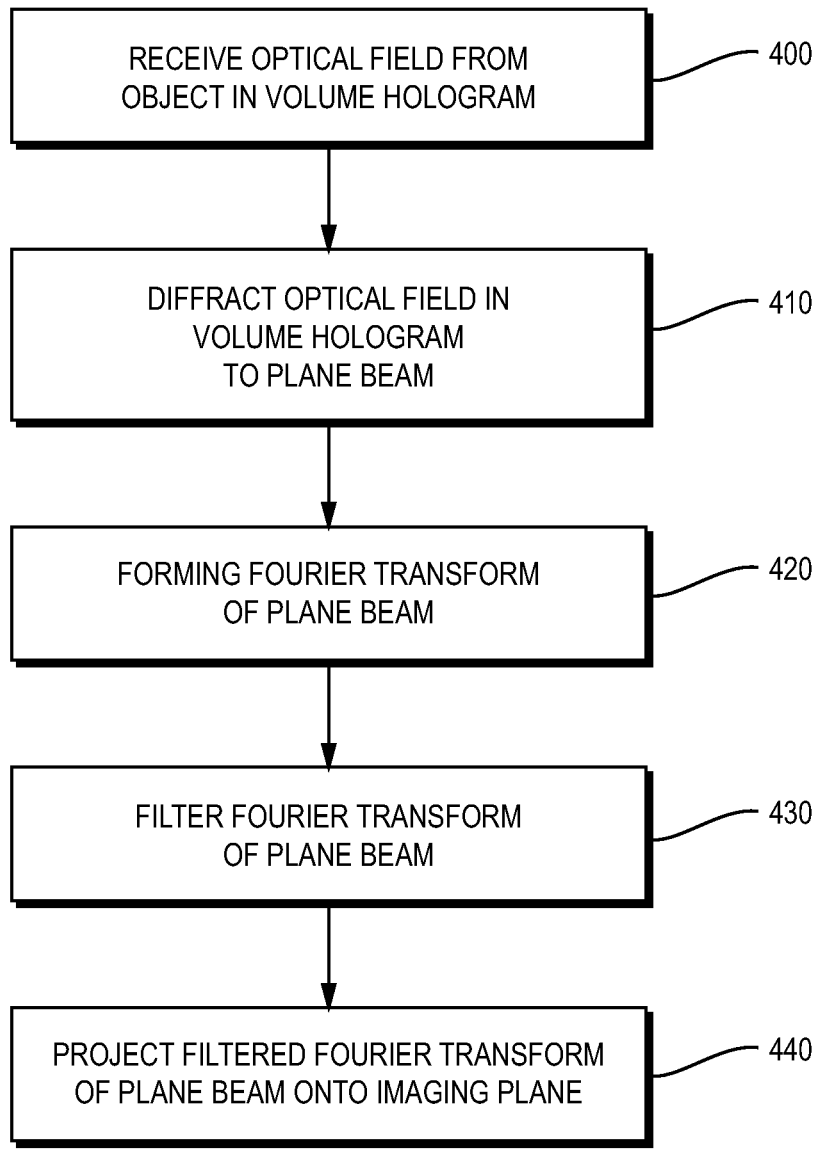
FIG. 4 is a flow diagram depicting an illustrative method for practicing an embodiment of a volume holographic imaging system as taught herein.

FIG. 4 depicts an exemplary method of imaging an object defined in four-dimensional space and real time using an exemplary volume holographic imaging system as taught herein. In step 400, multiplexed volume hologram 124 receives an optical field that has been scattered or emitted from the object 210 of interest. In some embodiments, the scattered or emitted optical field may be processed by one or more optical elements, such as the objective lens 222, to focus the received optical field onto the volume hologram 124. In step 410, a grating within the multiplexed volume hologram 124 diffracts the received optical field into one or more plane beams. The plane beam is a holographic representation of a 2-D slice of the object 210 taken at a plane within the object 210 that is Bragg matched to the grating in the volume hologram 124. In step 420, the Fourier transform of the plane beam is formed by the relay lenses 232 and 234 at an intermediate plane located at the phase filter 236. In step 430, the Fourier transform of the plane beam is filtered by the phase filter 236 to a filtered Fourier transform of the plane beam. In step 440, the Fourier transform of the plane beam diffracted from the phase filter 236 is projected onto an imaging plane 240. In some embodiments, the volume hologram 124 has two or more gratings recorded therein. In the same embodiment, the number of 2-D images that are simultaneously projected onto the imaging plane 240 in a non-overlapping manner corresponding to the number of gratings. Advantageously, the multiple images are simultaneously projected to non-overlapping portions of the imaging plane.

Figure 5:
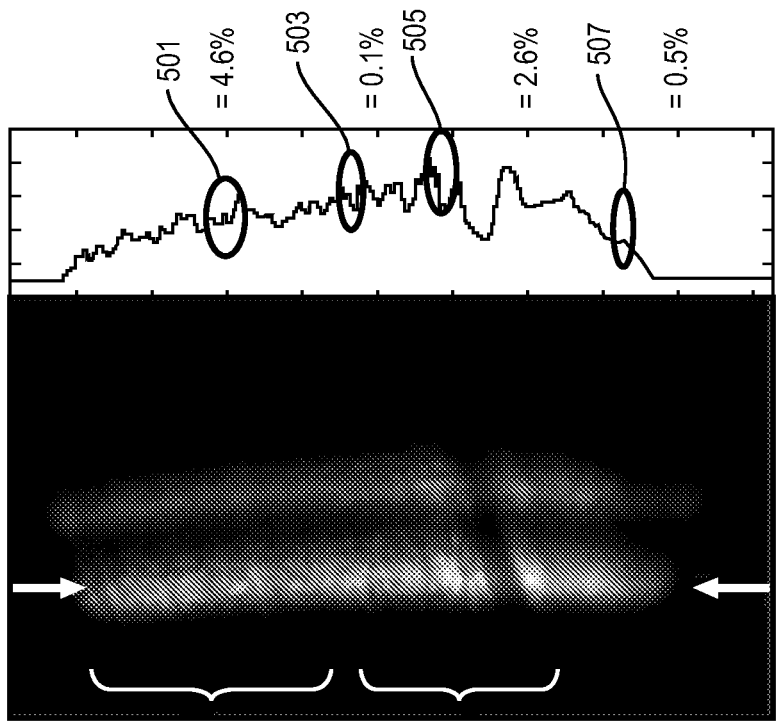
FIG. 5 illustrates an image of a mouse colon sample obtained by a conventional volume holographic microscopy.
Figure 6:
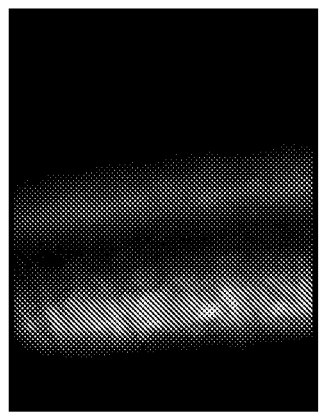
FIG. 6 illustrates an image of a zoomed section of the mouse colon image obtained by conventional volume holographic microscopy in FIG. 5.
Figure 7:
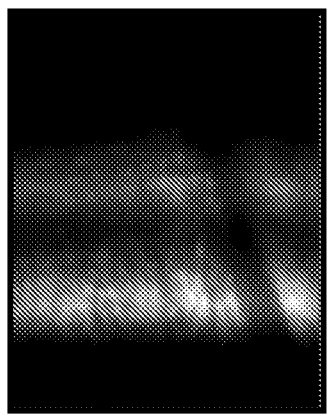
FIG. 7 illustrates an image of another zoomed section of the mouse colon image obtained by conventional volume holographic microscopy in FIG. 5.

FIG. 5 depicts a depth-resolved image of a mouse colon obtained using conventional VHM. FIG. 6 depicts an arbitrarily zoomed-in section of the mouse colon of FIG. 5 with interesting features visible in it. FIG. 6 is the correspondingly noted portion of FIG. 5. FIG. 7 depicts another arbitrarily zoomed-in section of the mouse colon of FIG. 5 with interesting features visible in it. FIG. 7 is also the correspondingly noted of FIG. 5.

Figure 8:
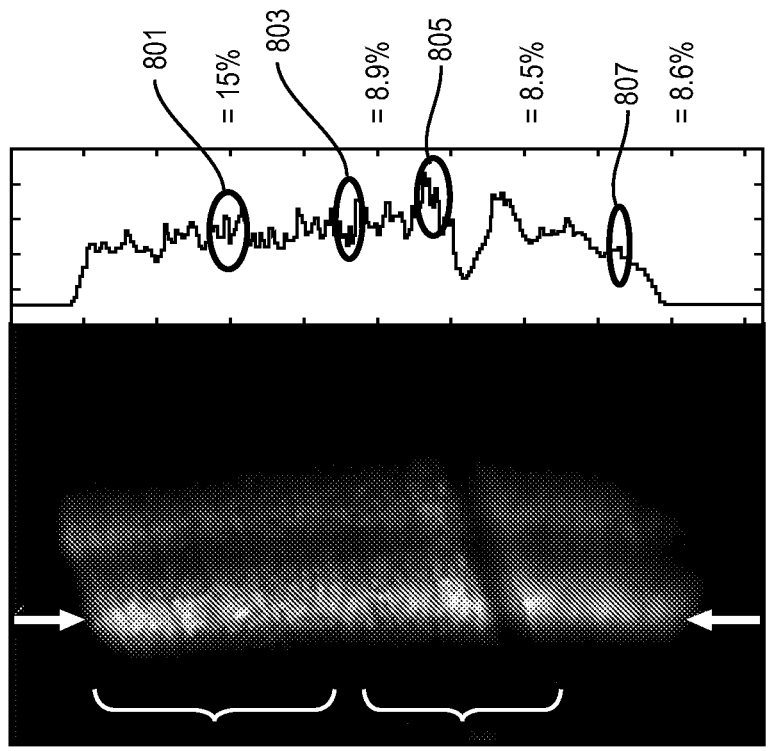
FIG. 8 illustrates an image of the mouse colon sample used in FIG. 5 obtained by an exemplary volume holographic microscope as taught herein.
Figure 9:
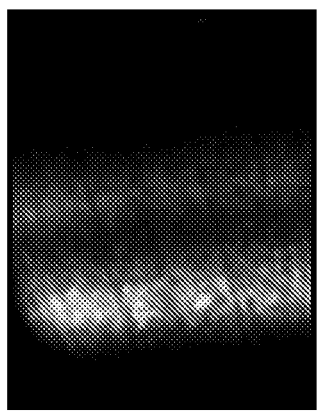
FIG. 9 illustrates an image of a zoomed section of the mouse colon image obtained by the exemplary volume holographic microscope in FIG. 8 corresponding to the section of the mouse colon shown in FIG. 6.
Figure 10:
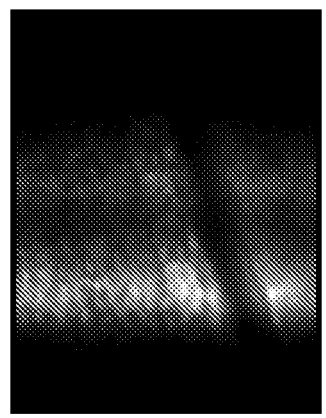
FIG. 10 illustrates an image of another zoomed in image of the mouse colon image obtained the exemplary volume holographic microscope in FIG. 8 corresponding to the section of the mouse colon shown in FIG. 7.

FIG. 8 depicts a depth-resolved image of mouse colon obtained using the exemplary imaging system as taught herein. FIG. 9 depicts a zoomed-in section of the mouse colon of FIG. 8 corresponding to the zoomed-in section of the mouse colon of FIG. 6. FIG. 10 depicts a zoomed-in section of the mouse colon of FIG. 8 corresponding to the zoomed-in section of the mouse colon of FIG. 7.

The images in FIGS. 5-8 were obtained by the same PQ-doped PMMA volume hologram with two multiplexed gratings, each grating imaging in parallel a different slice through the object: one slice just below the tissue surface and one approximately 50 µm in to the tissue. The mouse colon specimen was illuminated using a red LED with central wavelength of approximately 630 nm and spectral bandwidth of approximately 25 nm using the exemplary imaging system of FIG. 2. An Olympus objective lens (ULWDMSPlan50X), a Mitutuyo collector lens (MPlanAPO20X), and an Andor iXon CCD array (Andor X-2647) were used to produce the images of FIGS. 5-8. The field of view of this embodiment was approximately 1 mm by 0.8 mm.

FIGS. 5 and 8 further include the contrast ratio of different tissue features calculated along an arbitrarily selected vertical line on the same corresponding locations between the conventional VHM and exemplary imaging system's images (right-hand side inset of FIG. 5 and FIG. 8). At four arbitrarily selected features, 501, 503, 505 and 507 in the two images, the contrast ratio in FIG. 5 with conventional VHM was 4.6%, 0.1%, 2.6%, and 0.5%, respectively, while at corresponding locations, 801, 803, 805 and 807, in FIG. 8 using the exemplary imaging system as taught herein the contrast ratio was 15%, 8.9%, 8.5%, and 8.6%, respectively. The improvement in contrast ratio over the conventional VHM system varied from $$\frac{15\%}{4.6\%} = 3.3\times \text{ to } \frac{8.9\%}{0.1\%} = 89.0\times.$$

Advantageously the exemplary imaging systems taught herein increase the identification of structures, such as the turbid media depicted in FIGS. 5-8. The resulting images are contrast-enhanced, two-dimensional and observable in real time. Furthermore, exemplary imaging systems as taught herein can be applied to both fluorescence and non-fluorescence imaging and collects both spectral and spatial information of an object without mechanically scanning in the X-Y-Z direction for a given field of view.

FIGS. 11-14 are graphical representations of the Modulation Transfer Function (MTF) against line pairs per millimeter which shows the improvement in contrast ratio between a conventional VHM system and an exemplary imaging system as taught herein. Those skilled in the art will understand that MTF, also known as spatial frequency response, is used to measure the contrast and resolution of an imaging system. The higher the MTF values the greater the contrast and resolution of an imaging system. MTF is the modulus, or absolute value, of the Optical Transfer Function (OTF) of an imaging system. Those skilled in the art will understand that the OTF describes the spectral variation of a electromagnetic signal as a function of spectral angular frequency.

Figure 11:
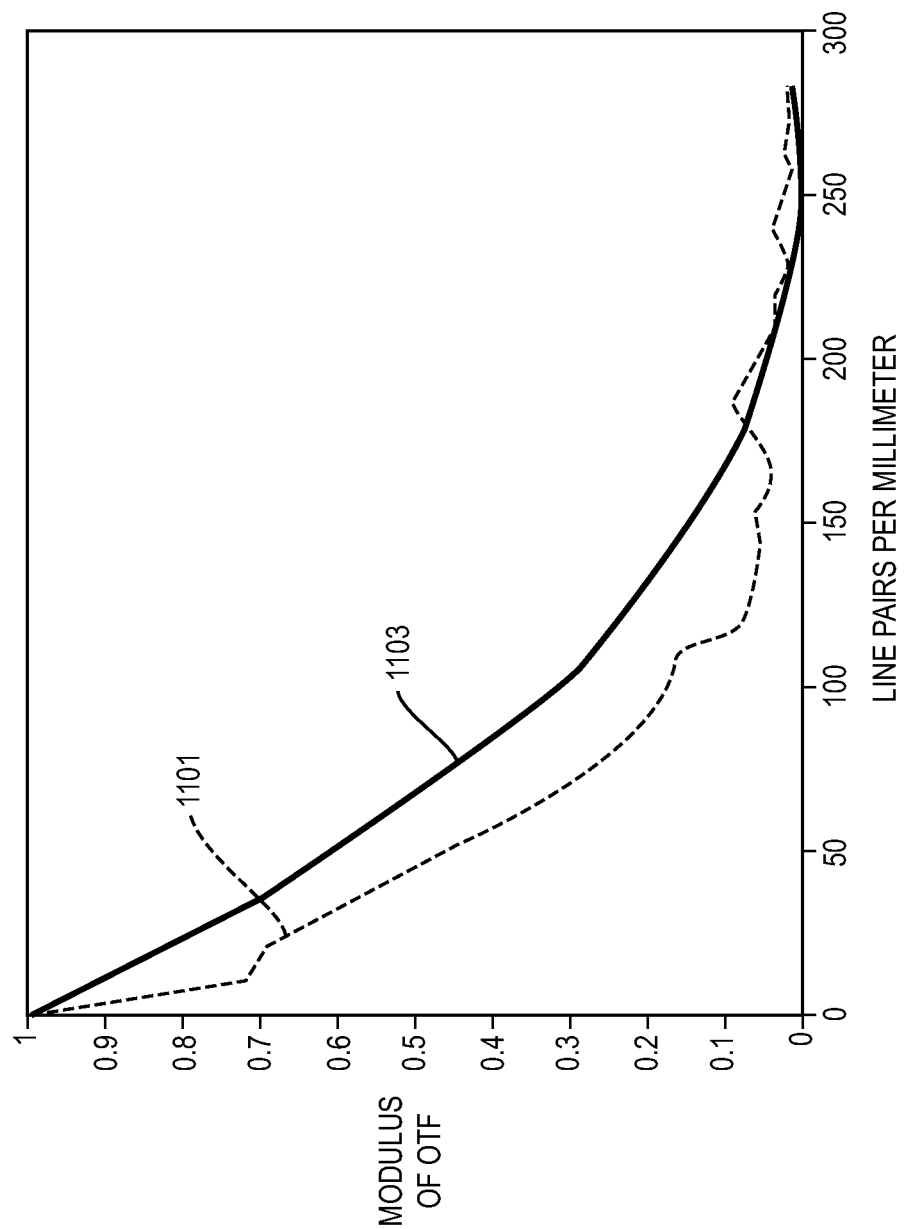
FIG. 11 is an illustrative graphical representation of the improvement in the on-axis modulation transfer function measurement resulting from the use of an exemplary volume holographic imaging microscope, as taught herein, taken along the x-direction.

FIG. 11 depicts exemplary on-axis MTF measurements along the x-direction or sagittal direction for both a conventional VHM and an exemplary imaging system, as taught herein. The results for a conventional VHM system are depicted by trace 1101. The results for an exemplary imaging system are depicted by trace 1103. Trace 1103 quantifies that the exemplary imaging system has a higher MTF value for almost all number of line pairs per millimeter.

Figure 12:
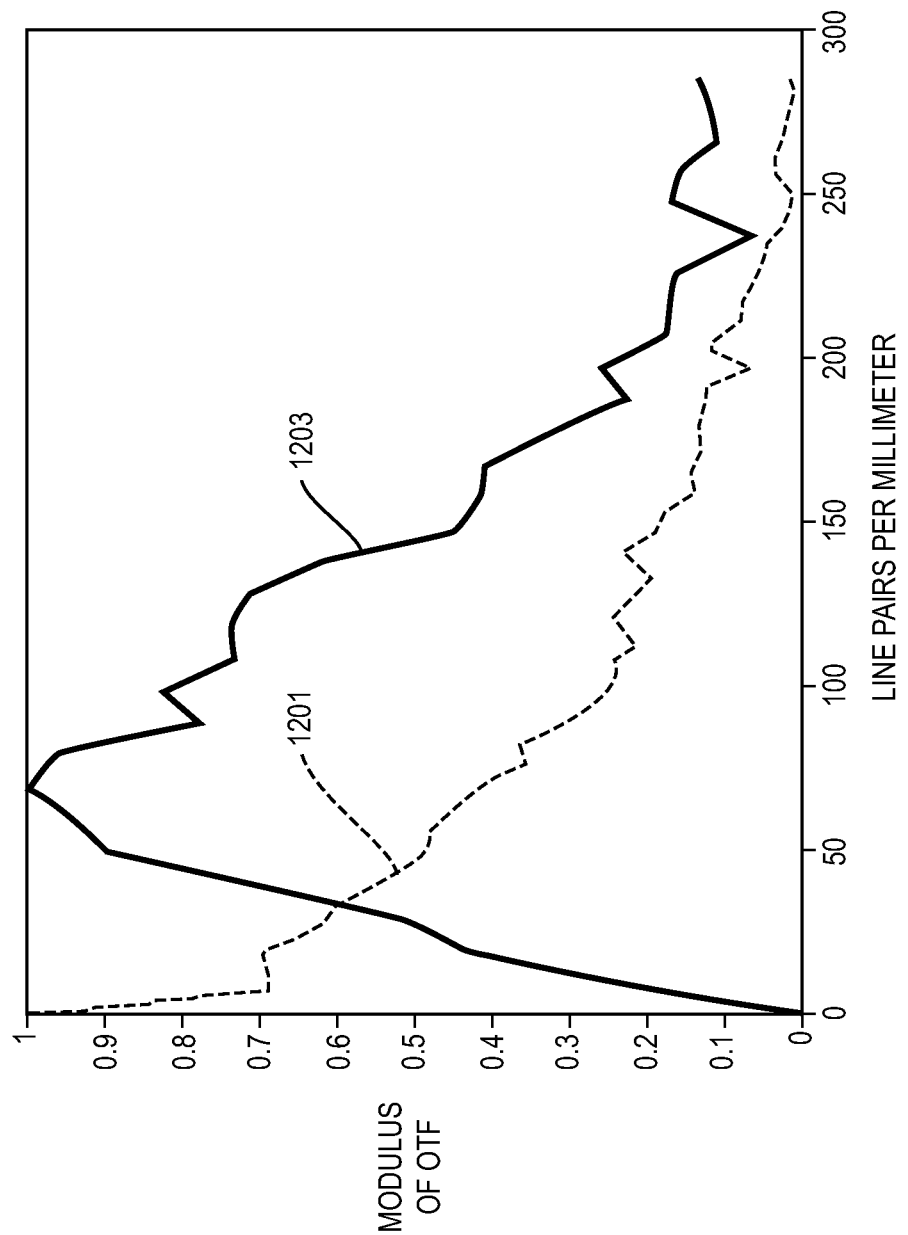
FIG. 12 is an illustrative graphical representation of the improvement in the on-axis modulation transfer function measurement resulting from the use of an exemplary volume holographic imaging microscope, as taught herein, taken along the y-direction.

FIG. 12 depicts exemplary on-axis MTF measurements along the y-direction or tangential direction for both a conventional VHM and an exemplary imaging system, as taught herein. The results for a conventional VHM system are depicted by trace 1201. The results for an exemplary imaging system are depicted by trace 1203. Trace 1203 quantifies that the exemplary imaging system has a higher MTF value for almost all number of line pairs per millimeter.

Figure 13:
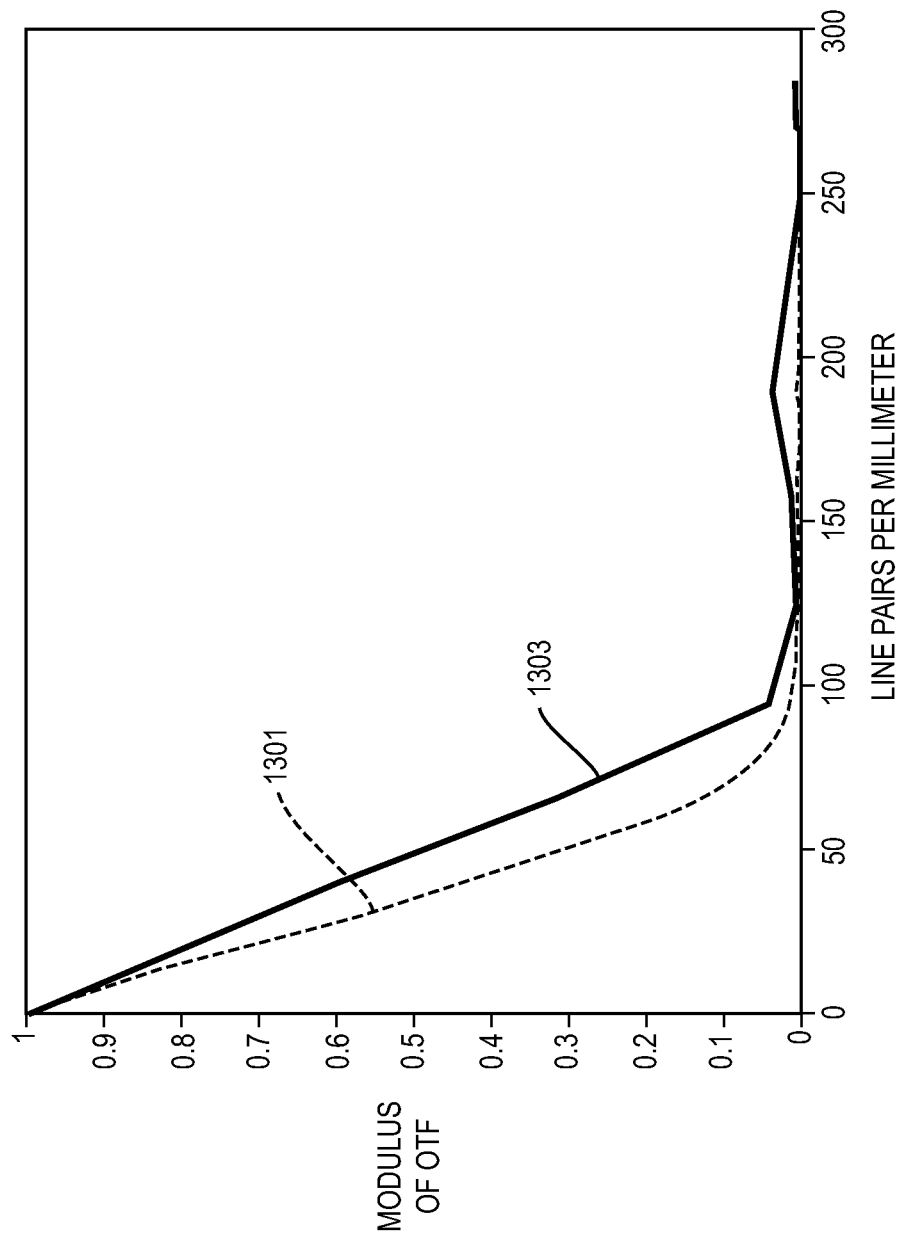
FIG. 13 is an illustrative graphical representation of the improvement in the off-axis modulation transfer function measurement resulting from the use of an exemplary volume holographic imaging microscope, as taught herein, taken along the x-direction.

FIG. 13 depicts an off-axis MTF measurements along the x-direction or sagittal direction for both a conventional VHM and an exemplary imaging system, as taught herein. The results for a conventional VHM system are depicted by trace 1301. The results for an exemplary imaging system are depicted by trace 1303. Trace 1303 quantifies that the exemplary imaging system has a higher MTF value for almost all number of line pairs per millimeter.

Figure 14:
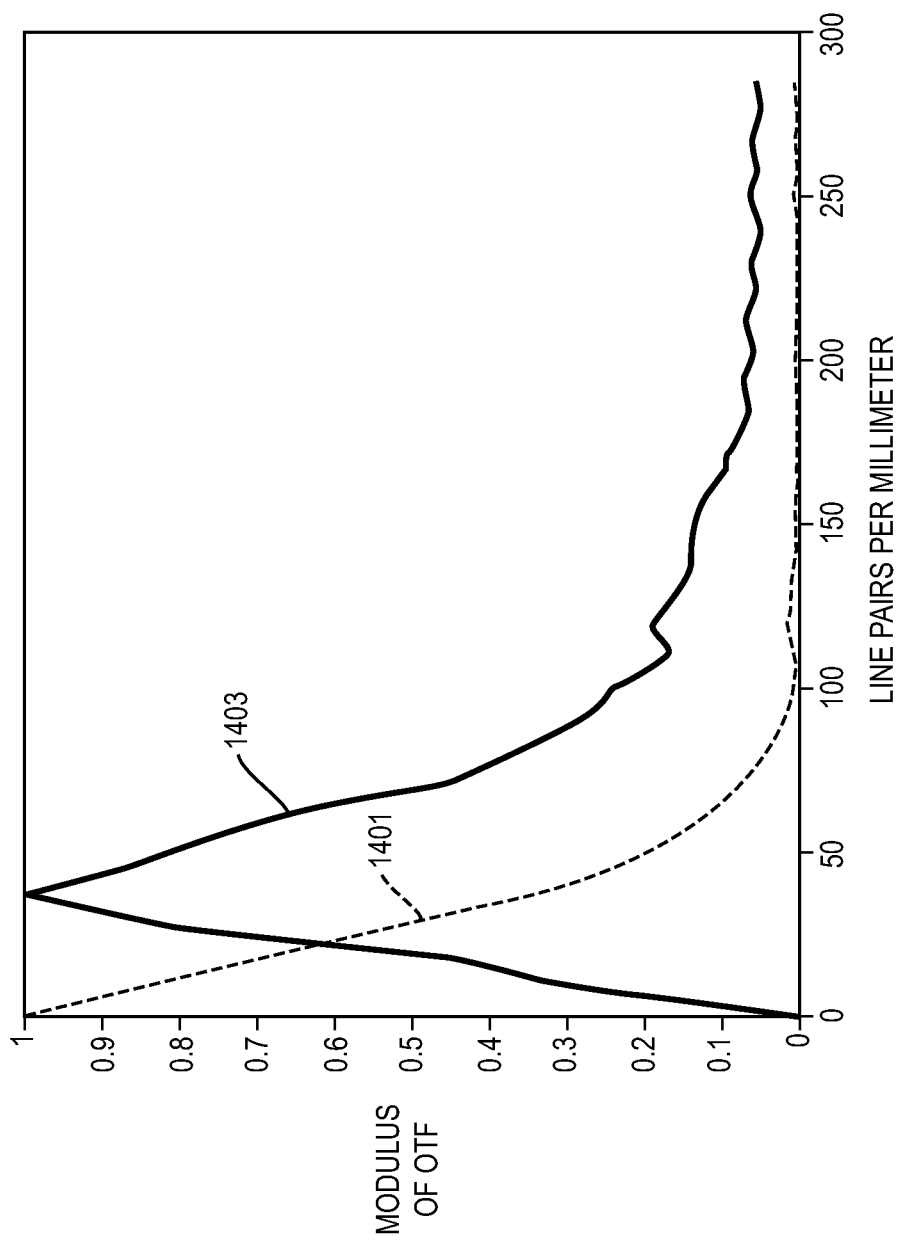
FIG. 14 is an illustrative graphical representation of the off-axis modulation transfer function measurement resulting from the use of an exemplary volume holographic imaging microscope, as taught herein, taken along the y-direction.

FIG. 14 depicts an off-axis MTF measurements along the y-direction or tangential direction for both a conventional VHM and an exemplary imaging system, as taught herein. The results for a conventional VHM system are depicted by trace 1401. The results for an exemplary imaging system are depicted by trace 1403. Trace 1403 quantifies that the exemplary imaging system has a higher MTF value for almost all number of line pairs per millimeter. FIGS. 11-14 quantify that the exemplary imaging system displays significantly enhanced information in the higher frequencies when compared to conventional VHM systems.

Although the teachings herein have been described with reference to exemplary embodiments and implementations thereof, the disclosed methods, systems and apparatus are not limited to such exemplary embodiments/implementations. Rather, as will be readily apparent to persons skilled in the art from the description taught herein, the disclosed methods, systems and apparatus are susceptible to modifications, alterations and enhancements without departing from the spirit or scope hereof. Accordingly, all such modifications, alterations and enhancements within the scope hereof are encompassed herein.

What is claimed:

1. An optical microscope comprising:
   an objective lens for receiving and collimating optical spectrum electromagnetic radiation emitted or scattered from an object of interest;
   a volume hologram with a plurality of multiplexed holographic gratings to receive and diffract the collimated optical spectrum electromagnetic radiation, each of the plurality of multiplexed holographic gratings being Bragg matched to diffract optical spectrum electromagnetic radiation corresponding to a different depth in the object of interest;
   a relay system to receive and relay the diffracted collimated optical spectrum electromagnetic radiation from the volume hologram corresponding to the different depths in the object of interest;
   a phase filter to receive and simultaneously filter the relayed collimated optical spectrum electromagnetic radiation from each of the different depths in the object of interest; and
   a focusing lens to focus onto an imaging plane the collimated optical spectrum electromagnetic radiation that passes through the phase filter simultaneously forming a plurality of filtered two-dimensional images of the object of interest each corresponding to one of the different depths in the object of interest,
   wherein the phase filter is located at the relayed conjugate plane of the volume hologram's pupil.

2. The microscope of claim 1, wherein the volume hologram is transmissive.

3. The microscope of claim 1, wherein the volume hologram is recorded in phenanthrenquinone doped poly methyl methacrylate.

4. The microscope of claim 1, wherein the relay system is a 4-f telecentric relay system.

5. The microscope of claim 1, further comprising a source of optical spectrum electromagnetic radiation.

6. The microscope of claim 1, wherein the phase filter is a Zernike filter.

7. The microscope of claim 1, wherein the phase filter is a knife edge filter.

8. A volume imaging system for imaging a source object comprising:
- a transmissive holographic element having a plurality of multiplexed gratings recorded therein, the transmissive holographic element configured to receive and diffract an optical field emitted from the source object into a plurality of diffracted plane beams, each of the plurality of multiplexed gratings being Bragg matched to diffract a different two-dimensional slice of the optical field corresponding to a different depth in the source object;
- collector optics including a 4-f telecentric relay system configured to:
  - focus each of the plurality of diffracted plane beams corresponding to the different two-dimensional slices of the optical field of the source object; and
  - for each of the plurality of diffracted plane beams, simultaneously project the corresponding focused two-dimensional slices of the optical field along an optical path onto an imaging plane; and
- a phase filter disposed along the optical path at the relayed conjugate plane of a pupil of the transmissive holographic element to simultaneously eliminate the DC component in the spatial frequency domain of the focused two-dimensional slices of the optical field from the different depths of the source object.

9. The volume imaging system of claim 8, wherein the collector optics include an imaging lens.

10. The volume imaging system of claim 9, further comprising a source of optical spectrum electromagnetic radiation.

11. The volume imaging system of claim 10, wherein the volume imaging system is configured to simultaneously diffract the different two-dimensional slices of the optical field corresponding to the different depths of the source object to non-overlapping regions of the imaging plane.

12. The volume imaging system of claim 11, wherein the source object is defined in four dimensional space and real time.

13. The volume imaging system of claim 11, wherein the phase filter is a Zernike filter.

14. The volume imaging system of claim 11, wherein the phase filter is a knife edge filter.

15. A method for imaging an object in four-dimensions and real time comprising:
- receiving an emitted or scattered optical field of an object in a transmissive holographic element, the transmissive holographic element having a plurality of multiplexed holographic gratings;
- diffracting the received optical field in the holographic element to a plurality of diffracted plane beams, each of the multiplexed holographic gratings being Bragg matched to diffract the received optical field corresponding to a different depth in the source object;
- forming, using relay lenses, Fourier transforms of the plurality of diffracted plane beams at an intermediate plane conjugate to a pupil of the transmissive holographic element;
- filtering, simultaneously and at the intermediate plane, the Fourier transforms of the plurality of diffracted plane beams corresponding to different depths in the object; and
- projecting the filtered Fourier transforms of each of the diffracted plane beams onto an imaging plane simultaneously, thereby forming a plurality of filtered two-dimensional images of the object, each corresponding to one of the different depths in the object.

16. The method of claim 15, wherein the filtering step is performed using a knife edge filter.

17. The method of claim 15, wherein the filtering step is performed using a Zernike filter.

18. The method of claim 15, wherein the filtering step eliminates the DC component in the spatial frequency domain of each of the Fourier transforms of the plurality of diffracted plane beams corresponding to the different depths in the object.

19. The method of claim 15, further comprising the step of processing the emitted optical field through objective optics.

20. The method of claim 19, wherein the objective optics comprises a collimating lens configured to collimate the emitted optical field.

21. The method of claim 20, wherein the objective optics is part of the holographic element.

* * * * *